United States Patent [19]

Bondioli

[11] Patent Number: 5,706,922
[45] Date of Patent: Jan. 13, 1998

[54] TRANSMISSION AND TORQUE-LIMITING JOINT

[76] Inventor: Edi Bondioli, Via Gina Bianchi No.18, 46029 Suzzara, Mantova, Italy

[21] Appl. No.: 620,006

[22] Filed: Mar. 21, 1996

[30] Foreign Application Priority Data

Mar. 23, 1995 [IT] Italy .................. FI95A0056

[51] Int. Cl.$^6$ ................... F16D 7/04
[52] U.S. Cl. ............. 192/56.5; 192/71; 192/108; 464/37
[58] Field of Search ............. 192/56.1, 56.5, 192/71, 108; 464/37

[56] References Cited

U.S. PATENT DOCUMENTS

| 2,781,118 | 2/1957 | Pechy . |
| 3,643,770 | 2/1972 | Faulds . |
| 4,468,206 | 8/1984 | Herchenbach et al. ............ 464/37 |
| 4,848,547 | 7/1989 | Kampf .................... 192/56.5 X |
| 5,342,241 | 8/1994 | Kampf ........................ 464/37 |

FOREIGN PATENT DOCUMENTS

| A-0543142 | 5/1993 | European Pat. Off. . |
| A-2 615 256 | 11/1988 | France . |
| C-912411 | 5/1954 | Germany . |
| 30 01 566 | 7/1981 | Germany . |
| 32 05 513 | 3/1983 | Germany . |
| 92 06 232 U | 8/1992 | Germany . |

*Primary Examiner*—Richard M. Lorence
*Attorney, Agent, or Firm*—McGlew and Tuttle

[57] ABSTRACT

A transmission and torque-limiting joint able to disengage the driven member from the driving member upon exceeding a maximum value of the transmitted torque and to allow re-engagement at a lesser value of the relative velocity, with cooperating recesses (5) and sliders (20); the sliders (20) are wedge-shaped so as to cooperate with pairs of shaped pads (10) urged towards one another by springs (12).

14 Claims, 8 Drawing Sheets

5,706,922

TRANSMISSION AND TORQUE-LIMITING JOINT

DESCRIPTION

The subject of the invention is a coupling, that is to say a transmission and torque-limiting joint able to disengage the driven member from the driving member upon exceeding a maximum value of the transmitted torque and to allow re-engagement at a lesser value of the relative velocity, one of the two members being outer and the other inner.

An objective of the invention is to produce the joint in such a way that the region around the axis of rotation is unencumbered and hence available for elements of the transmission. Another objective is to produce a joint which lends itself to many different applications, and which consists of several units which are identical but capable of varying performance. These and other objectives will become apparent from the text which follows.

According to the invention, on the inner surface of the outer members receptive recesses are provided; in the inner member at least two tangential seats are provided, each extending orthogonally to a radial direction and lying parallel to a plane orthogonal to the axis of rotation of the joint; in correspondence with each of said tangential seats, a radial glide seat is formed extending between the periphery of said inner member and the tangential seat; in each of said tangential seats, two opposed pads can glide, elastically urged towards one another and having opposing surfaces with receptive symmetrical shapings; in each of said radial glide seats, a slider with a wedge-shaped inner profile can move, able to glide centripetally so as to penetrate between the two pads, thus parting them, when the elastic urgings acting on said pads are overcome; the slider exhibits a shaped outer profile able to cooperate with one or the other of said receptive recesses of the outer member. Said outer profiles of the wedge-shaped elements and said receptive recesses of said outer member are able to cooperate so as to transmit a torque between said two members, inner and outer, and to generate a centripetal thrust on the wedge-shaped element, which thrust increases with the increase in the transmitted torque, such as to cause the separation of the two pads with the aid of the wedge-shaped profile of the slider and of the centripetal movement of the slider such as to free the latter from the recess in which it was captive; the reverse movements with the aid of the elastic urgings on the pads being obtained after a reduction in the relative speed between said two members, driving and driven.

The tangential seats of the inner member are separated from the axis of rotation of the members of the joint, leaving available the space around said axis of rotation.

The sliders can extend plate-like so as to glide in glide seats with plane, parallel walls. Alternatively the sliders can be turned, with active chamfers and with anti-rotation keys or pins.

According to an advantageous embodiment, the wedge-shaped profile of the sliders extends with two opposed intermediate surfaces having a dihedral of lesser aperture, two opposed end surfaces having a dihedral of greater aperture and defining the ridge of the wedge, and another two opposed surfaces also having a dihedral of greater aperture; correspondingly said opposing surfaces of the pads have shapings with one or two opposed intermediate regions defining one or two portions of a dihedral of the same aforesaid greater aperture, followed on opposite sides by regions defining one or two portions of dihedrals having the same abovementioned lesser aperture.

In order to obtain effective behavior upon freeing and after freeing through excess torque transmitted between the two members of the joint there is provision that: the recesses of the inner surface of the outer member exhibit a first substantially radial flank, a bottom running substantially in correspondence with said inner surface, a second inclined flank, and a junction between said second inclined flank and said inner surface of the outer member; and that the shaped outer profile of the sliders exhibits correspondingly a first substantially radial flank, an end surface running substantially in correspondence with said inner surface of the outer member, a second inclined flank like that of the recesses and a junction between said end surface and said second flank having an orientation substantially corresponding to that of said junction of the recesses; and said two junctions are intended to come into mutual contact during the conditions of freeing and of independent rotation between said two members of the joint.

The invention will be better understood by following the description and the attached drawing, which shows a practical non-limiting illustration of the invention.

DETAILED DESCRIPTION OF THE PREFERRED EMBODIMENT

Figure 1:
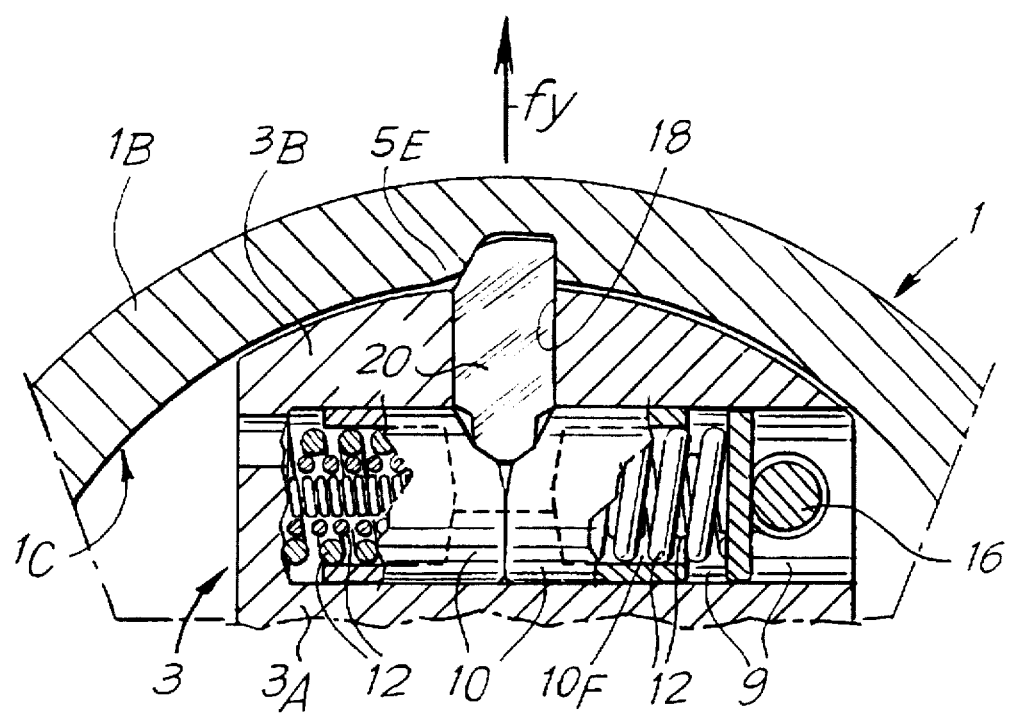
FIG. 1 shows in partial section a unit of a transmission and torque-limiting joint in the transmission position.
Figure 2:
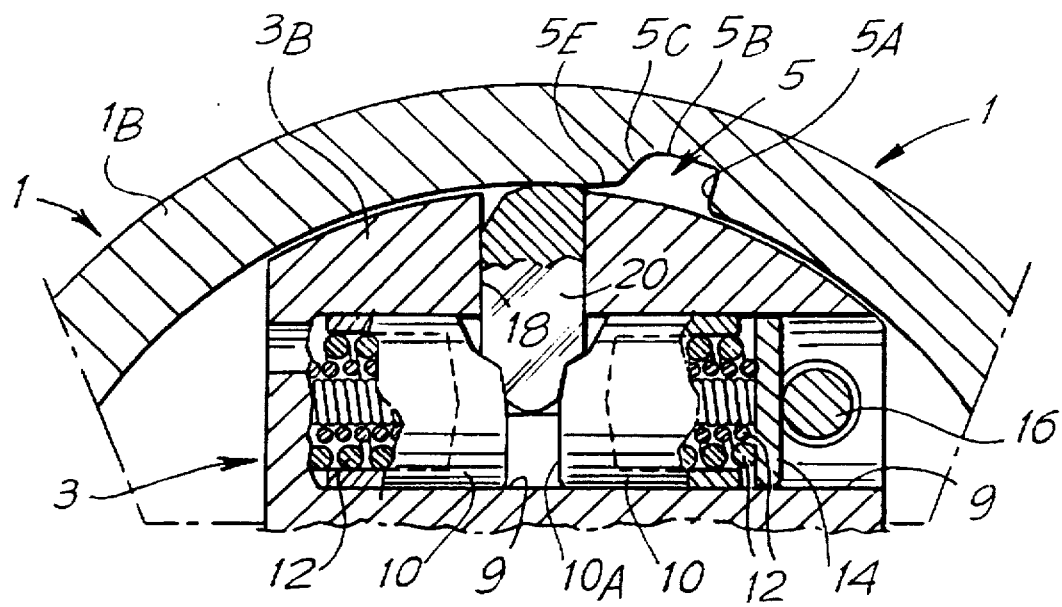
FIG. 2 shows the partial section similar to that of FIG. 1 with said unit in the position occupied when freed from the transmission.
Figure 3:
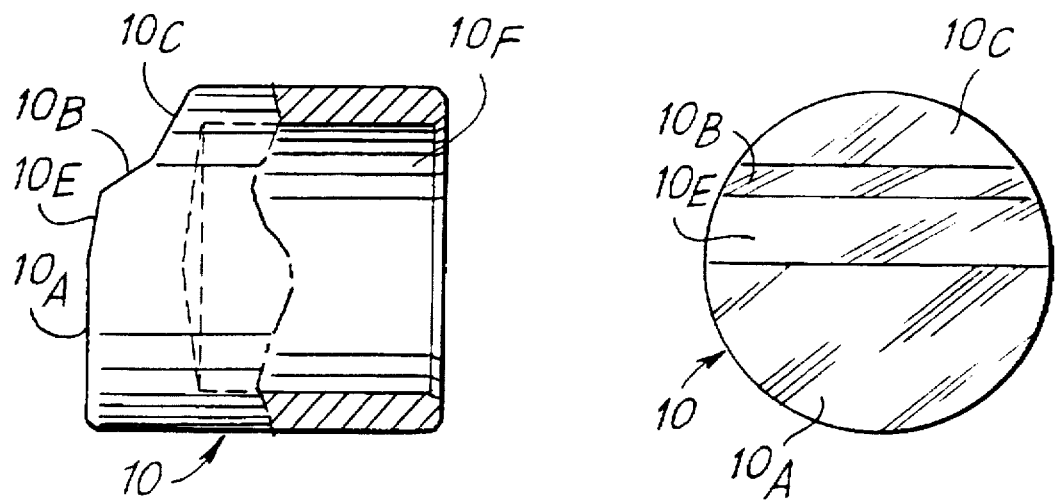
FIGS. 3 and 4 show separately: a pad component in partial section and in the view along A—A; and a slider component of said unit as well as a detail of one of the members.
Figure 4:
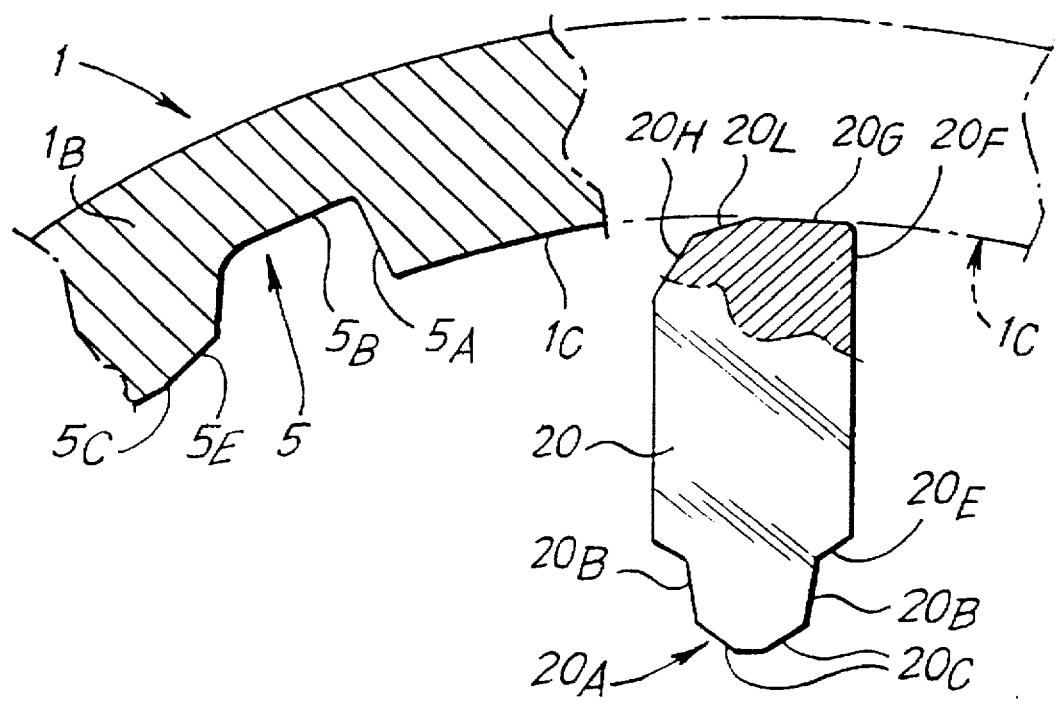
Figure 8:
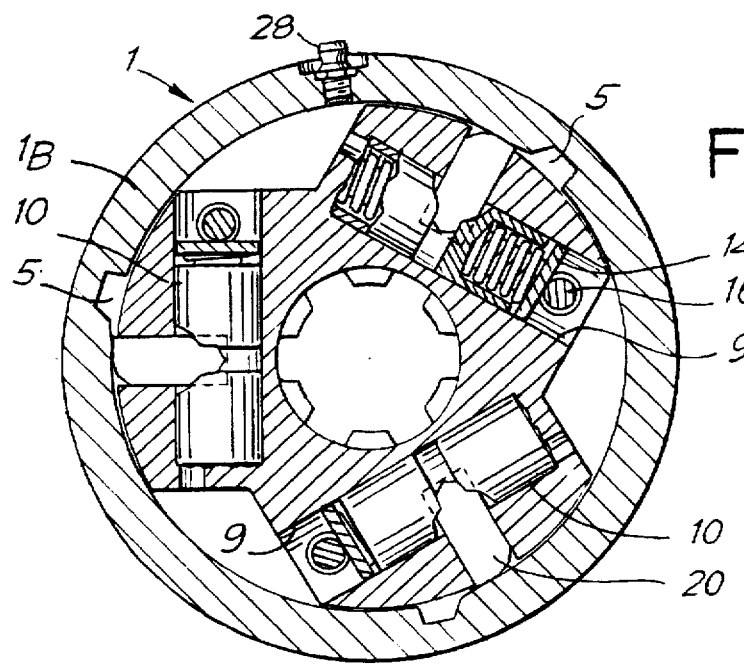
FIGS. 7 and 8 are similar to FIGS. 5 and 6, but show another embodiment of the joint, in the freed position.
Figure 7:
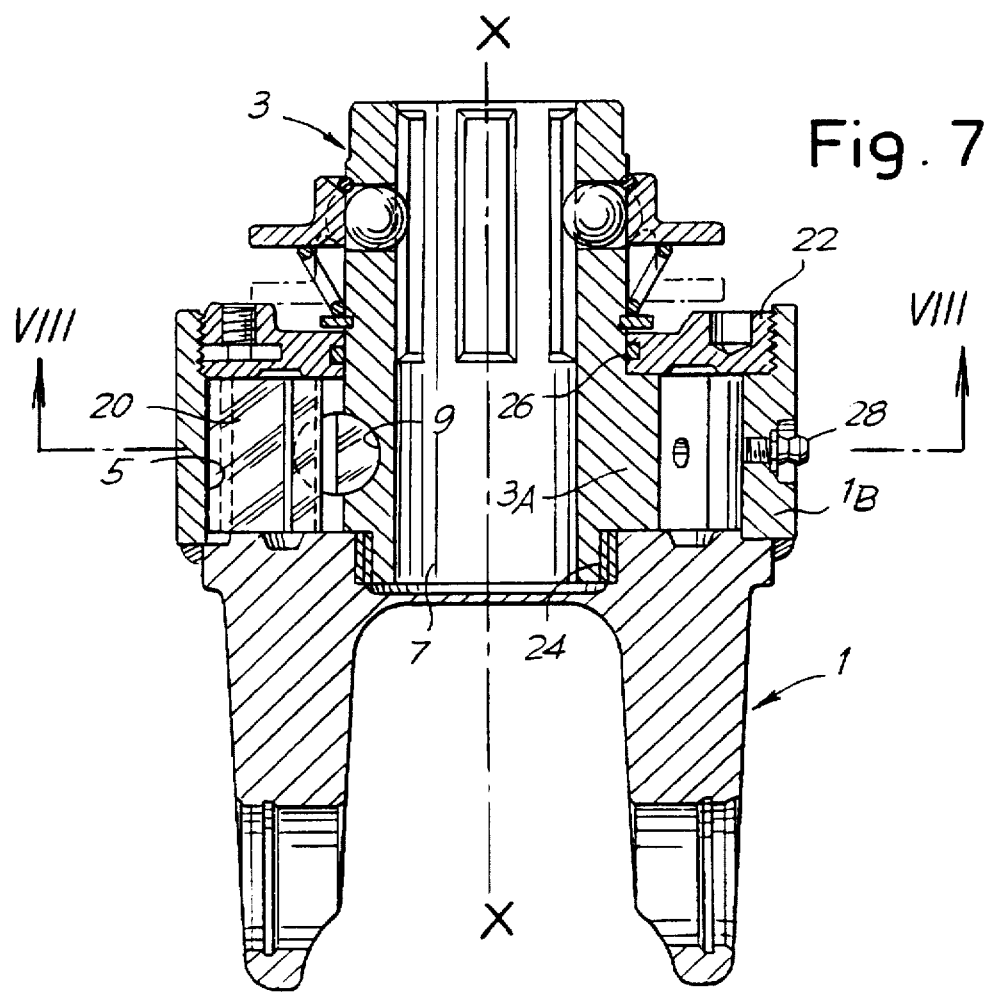

According to what is illustrated in FIGS. 1 to 7, a joint or coupling is illustrated which comprises—in one and the same plane transverse to the axis of rotation X—X—three coupling units as shown in detail in FIGS. 1 and 2 and which provides for the arrangement of the units in two transverse planes, so as to obtain an assembly with six units. Shown in FIG. 8 is a section similar to that of FIG. 5, but of an embodiment with just three units contained in one and the same single transverse plane.

Indicated generically by 1 and 3 in FIGS. 1 to 7 are an outer member and an inner member of a joint or coupling, one of the two members driving and the other being driven. Considering in particular FIG. 5, the outer member 1 is a forked element with a fork 1A of an articulated shaft (and in particular a cardan shaft) in which a skirt 1B is welded to the fork 1A and constitutes the part surrounding the inner member 3 and hence the part outside the member 3; this skirt 1B has, in particular, an inner surface 1C which is circular cylindrical. Several receptive recesses 5, according to FIG. 6 three recesses, extend from said inner surface 1C of the outer member 1B, each recess exhibiting (see FIG. 4) a first flank 5A of substantially radial extent, a bottom 5B having an extent substantially corresponding with that of the inner surface 1C of the skirt 1B, a second flank 5C inclined with respect to a radial direction, and a junction surface 5E between the second flank 5C and said inner surface 1C of the skirt 1B of the outer member 1.

The inner member 3 has a hub 3A and an axial appendage, with an axial hole 7 which in the drawing is a through-hole and which has a stretch with longitudinal grooved profiles to allow rapid engagement or disengagement with a grooved shaft, and with ball-type or other equivalent retaining means which are known per se in the art. The hub 3A has three projections 3B which are delimited by portions of cylindrical surfaces substantially corresponding to those of the inner surface 1C of the skirt 1B forming part of the outer member. In each of these projections at least one tangential seat 9 is made which in practice can be a cylindrical seat with its axis lying in a transverse plane with respect to the axis X—X of rotation of the joint formed by the two members 1 and 3; in FIG. 5 there are two seats 9, whereas in FIG. 8 there is a single seat 9. The seat 9 extends as a blind hole and is for the most part of circular section. Each seat 9 glidingly accommodates two pads 10, which are opposite one another with respect to a radial plane passing through the axis X—X. The opposite faces 10A of the two pads 10 accommodated in one and the same seat 9 exhibit receptive shapings which consist of two opposing intermediate regions 10B defining portions of a dihedral of relatively sharp aperture and which are followed—on opposite sides of the intermediate regions 10B—by outer regions 10C and regions 10E further in and defining, with the corresponding regions of the opposing pad, two dihedrals of mutually identical aperture and of lesser aperture as compared with the aperture of the dihedral formed by the intermediate regions 10B of the two opposing pads 10. From the face opposite the shaped one 10A, the pads 10 exhibit a wide seat 10F able to accommodate changeable and/or multiple springs 12 for determining an elastic exertion on the respective pads 10 towards the opposite pad, that is to say an exertion which tends to bring together the two shaped surfaces 10A, 10B, 10C, 10E of each of the pads. The springs 12 of one of the pads 10 react on the closed bottom of the seat 9 and the springs 12 of the other of the pads 10 react on a bearing 14 introduced into the seat 10 and held therein by a plug means 16 or the like, to allow the fitting of the components accommodated in the seat 9.

Each of the projections 3B of the inner member 3A exhibits a radial glide seat 18 (FIGS. 1 and 2) which is defined by two plane walls lying in geometrical planes orthogonal to the axis of the corresponding seat(s) 9 formed in the relevant projection 3B. The radial glide seat 18 can be recessed using suitable tools and the seat 18 interferes with the corresponding seat(s) 9. A plate-like slider 20 which is shaped with an inner profile generically indicated by 20A can glide in a radial direction in each radial glide seat 18.

This inner profile exhibits (seen in particular in FIG. 4) two opposite intermediate surfaces 20B with a dihedral of lesser aperture, two opposite end surfaces 20C with a dihedral of greater aperture and defining the ridge of the wedge, and another two opposite surfaces 20E with a dihedral of greater aperture identical to that of the dihedral of the surfaces 20C; the inclinations of the surfaces with dihedral 20B correspond substantially with those of the surfaces 10E and the inclinations of the surfaces with dihedral 20C and 20E correspond substantially with those of the surfaces 10E and 10C of the pads 10. Each slider 20 exhibits an outer profile shaped correspondingly with that of the recesses 5 and in particular the outer shaping exhibits a first substantially radial flank 20F which corresponds with the first flank 5A of the recess 5, an end surface 20G which extends substantially in a manner corresponding to the extent of the bottom 5B and of the surface 1C, a second flank 20H inclined substantially like the second flank 5C of the recess 5, as well as a junction surface 20L which extends between said end surface 20G and said second flank 20H and which has an orientation substantially corresponding to that of said junction 5E of the recesses 5.

It is noted that each seat 18 in the embodiment of FIGS. 1 to 6 extends in the projection 3B in which it is made in order to interfere with two flanking tangential seats 9, since the seats 9 are six in total, i.e. two for each of the three projections 3B of the inner hub 3, 3A. In the embodiment of FIG. 8 the inner hub 3A is narrower and only one trio of seats 9 is provided, one for each of the projections 3B.

In either of the versions indicated above there is provision for the hub 3A of the inner member 3 to be held by a discoidal cover 22 (FIGS. 5 and 8) applied to the end of the cavity defined by the skirt 1B. Suitable leaktight linings such as 24 and 26 will be provided in order to ensure lubrication inside the cavity defined by the skirt 1B, for the operability of the components of the above-described joint and the operation of which is explained hereinbelow; the supply of lubricant will be ensured by suitable lubricators such as 28.

Irrespective of the embodiment, it should be observed that the central part of the hub of the inner member 3 remains available as space which can be used for the mechanics of the joint, such as the through seat 7 with mating grooved profiles, or the like which may be required for the application to which a torque-limiting joint according to the invention is applicable.

Figure 6:
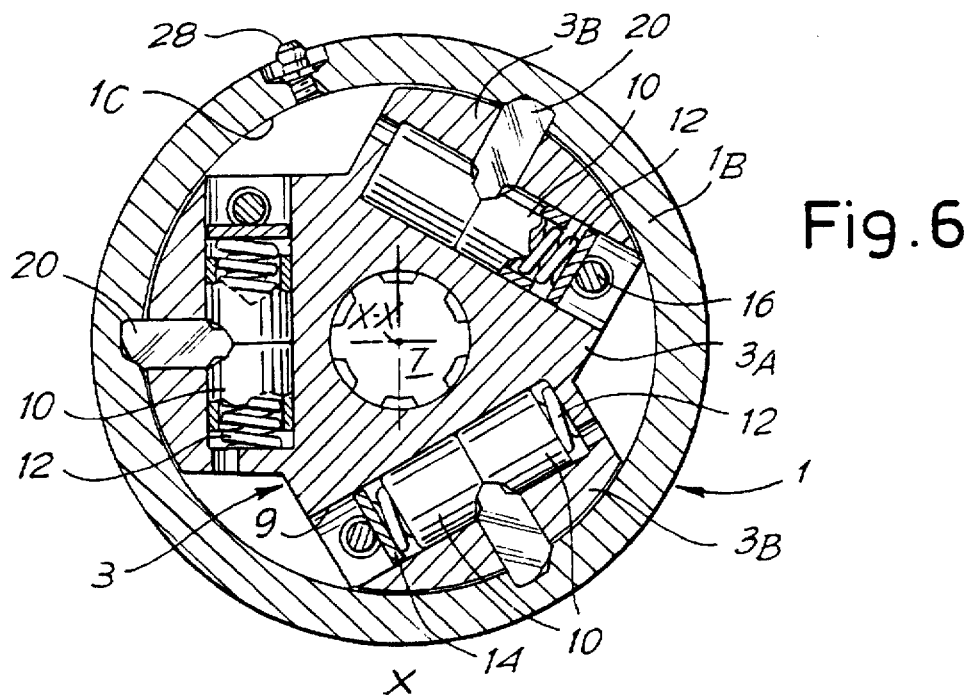
FIGS. 5 and 6 show a joint or coupling according to the invention in the transmission position, in transverse section and in a longitudinal section along VI—VI of FIG. 5, in which there are provided three units of the type shown in FIGS. 1 and 2 in the transmission position.
Figure 15:
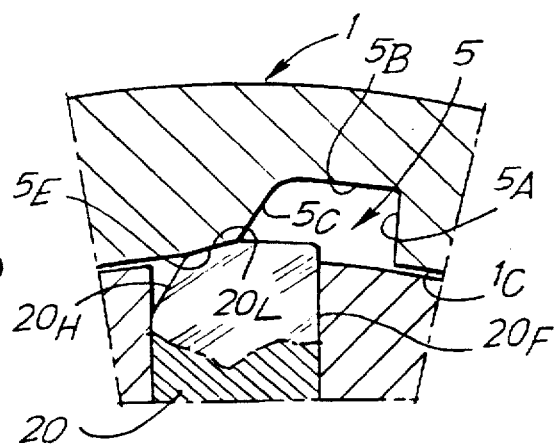
FIG. 15 shows a transient condition between elements of the two members.

In the torque transmission position, the various elements of the joint or coupling are arranged as shown in FIGS. 1 and 6. The two pads 10 are adjacent, with the surfaces 10A in contact or almost in contact with each other, with the aid of the elastic exertion imposed by the springs 12. The sliders 20 are moved in the centrifugal direction, i.e. in the direction of the arrow FY of FIG. 1 and become housed in a corresponding recess 5. Therefore the flanks 20F and 20H come substantially into contact with the flanks 5A and 5C, the end surface 20G ends up opposite the bottom 5B and the wedge surfaces 20C correspond with the opposing intermediate surfaces 10B of the adjacent pads 10. Transmission occurs through the thrust between the flanks 5C and 20H, from the driving member to the driven member which can either be the inner or outer one. When the resisting torque, which is overcome by the torque transmitted as stated above, exceeds a certain value, a thrust is determined between the inclined surfaces 20H and 5C, through which a thrust in the centripetal direction (i.e. in the direction opposite to the arrow FY) is determined on the sliders 20, and the wedge consisting of the surfaces 20C of the end 20A of each slider 20 tends to urge the two pads 10 in a direction such as to part them against the action of the respective antagonist springs 12. When the resisting torque reaches a predetermined limit, i.e. when the driving torque exceeds a certain limit, the thrust in the direction opposite to the arrow FY, i.e. the centripetal thrust on the sliders 20, is such that it overcomes the elastic reaction of the springs 12 causing the pads 10 to separate until each unit among those described by the position of FIG. 1 is made to reach the position of FIG. 2, in which the slider 20 has penetrated with a centripetal movement causing the parting of the pads 10 and the bearing of the wedge surfaces 20E against the wedge surfaces 10B, as is clearly visible in FIG. 2; under these conditions the end surfaces 20G of the sliders 20 are in alignment with the inner surface 1C of the skirt 1B of the outer member and the angular mating between the two members 1 and 3 ceases and hence it is possible to obtain relative angular gliding between the two members, as shown by the offset between the sliders 20 and the recess 5 which is illustrated in FIG. 2. Thereby the freeing of the two members of the joint or coupling is obtained, as well as a relative and relatively very fast rotation, whereby the sliders 20 do not tend to penetrate again into the recesses 5 which come into correspondence with the aforesaid sliders, until such time as this relative angular movement diminishes in speed; the tendency for the sliders 20 to penetrate into the recesses 5 is determined by the centrifugal components, i.e. those in the direction of the arrows FY, which the pads 10 exert on the sliders 20 through the effect of the elastic thrust of the springs 12 across the contacting surfaces 10E and 20B which define dihedrals of relatively limited aperture. With a high relative speed between the two members 1 and 3, when a slider 20 passes in front of a recess 5 there is at most a slight impact between the surface of the junction 20L and the surface of the junction 5E and hence the slider (see FIG. 15) does not have time to penetrate into the recess 5 and continues its movement and passes over the aforesaid recess 5; this takes place until such time as the relative tangential speed between the two members 1 and 3, i.e. between the projections 3B and the inner surface 1C of the skirt 1B, diminishes to the point where the centrifugal thrust in the direction of the arrow fy on the sliders 20 is sufficient to cause the sliders 20 to penetrate again into the recesses 5, so as to return from the position of FIG. 2 to the position of FIG. 1; this diminution in the relative speed can also be such as to reach the condition of rest or anyway of near-equality between the speed of the two members. Particularly noteworthy operation of the torque-limiting coupling is thereby obtained, aimed at the dynamical requirements sought or desired of these contrivances.

By varying the number of units like those illustrated in FIGS. 1 and 2—for example two or three or four or multiples of two or of three or of four, for example four, six, eight—it is possible to obtain a wide range of different dynamical effects. Further possibilities of variations within the scope of the same morphology of the driving and driven members of the joint can be obtained by modifying the characteristics of the elastic thrusts of the springs 12, by substituting one spring by another, respectively adding or removing coaxial helical springs to or from the seats 10F of the pads 10. Variations in the characteristics of a joint can also be obtained by varying the inclination of the flanks 5C and 20H respectively by varying the inclinations of the surfaces 10E, 10B, 10C and the surfaces 20C, 20B, 20E, to obtain a variation in the radial components acting on the sliders 20 in the positions shown in FIGS. 1 and 2 respectively.

Figure 5:
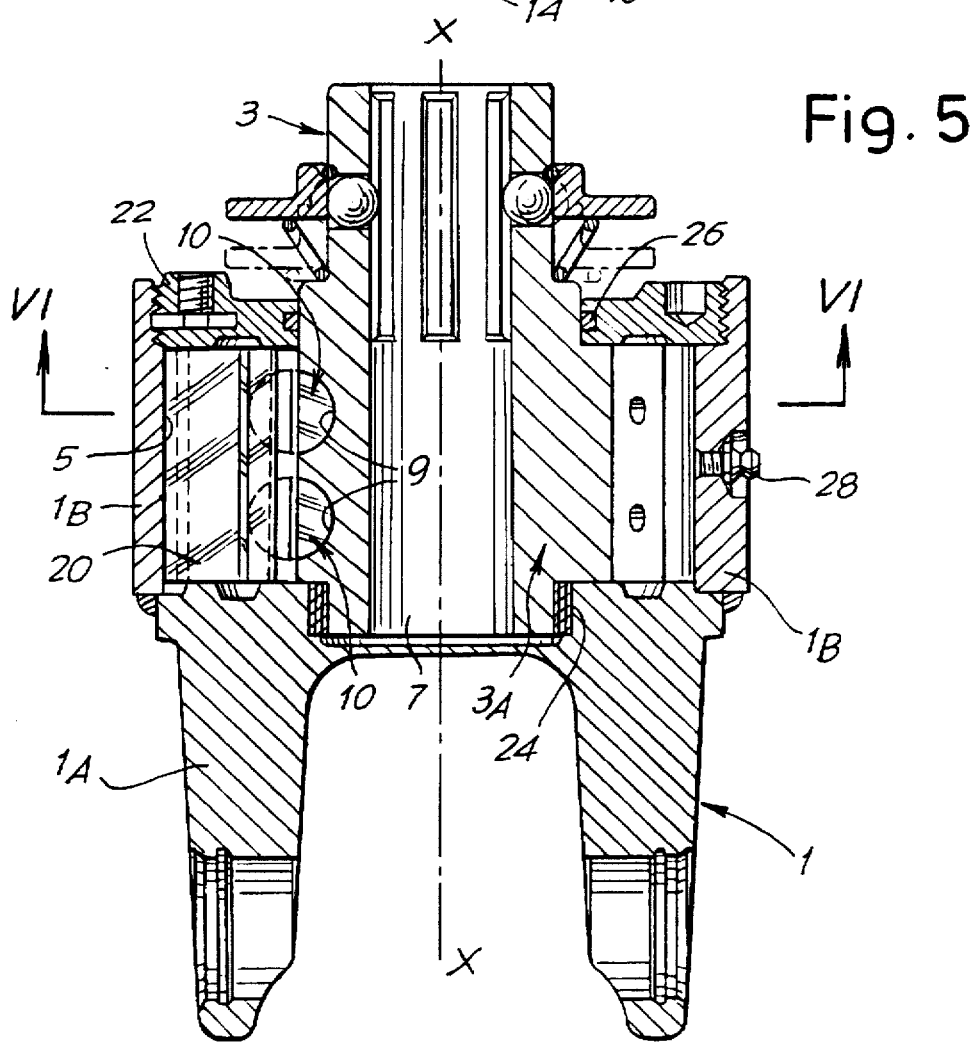

Comparing FIGS. 5 and 8 it is noted that with the same types of components it is possible to obtain two different joints, with three units and with six units respectively, arranged in two planes transverse to the axis X—X of the joint or coupling.

Figure 10:
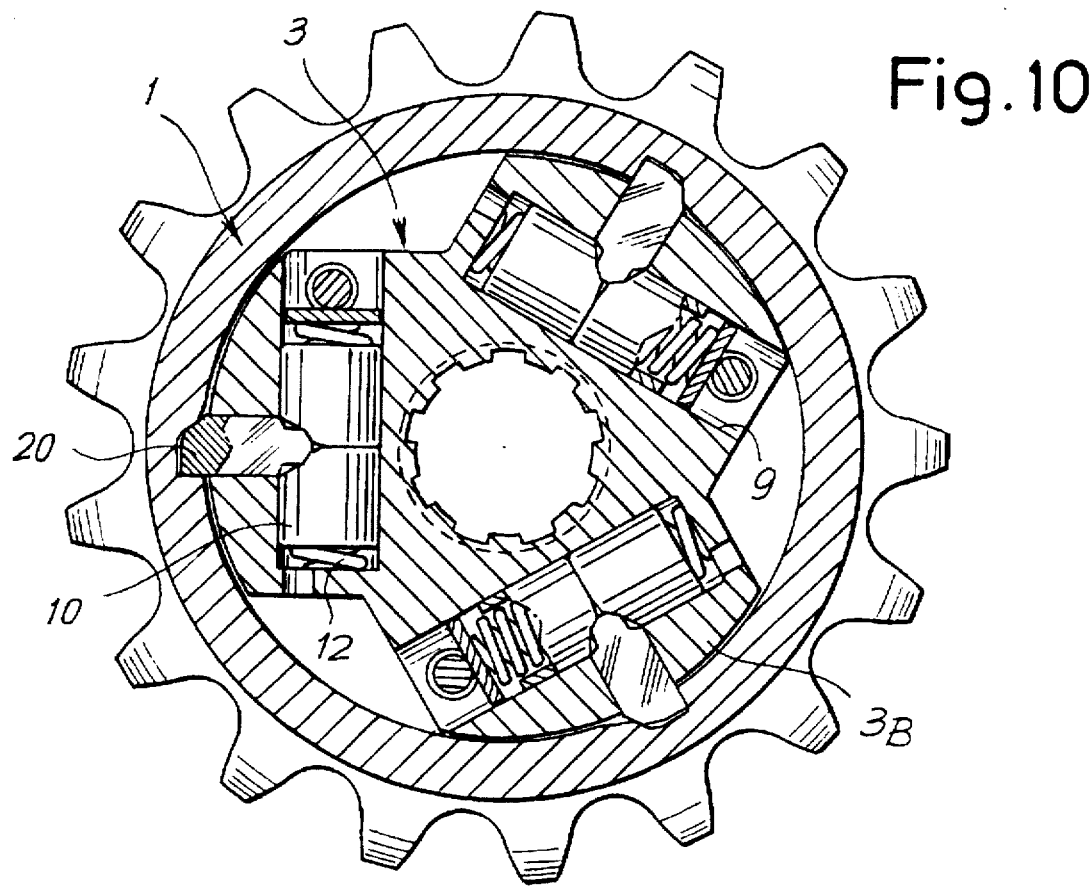
FIGS. 9 and 10 show an axial section and a transverse section along X—X of FIG. 9 which show another application of a joint with three coupling units.
Figure 9:
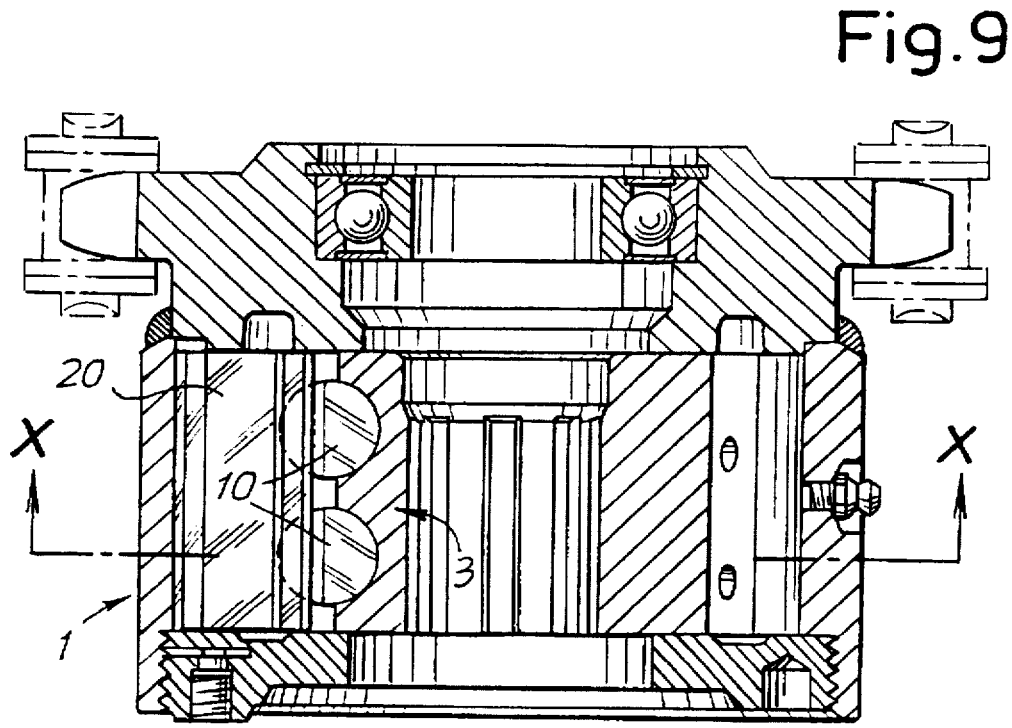
Figure 11:
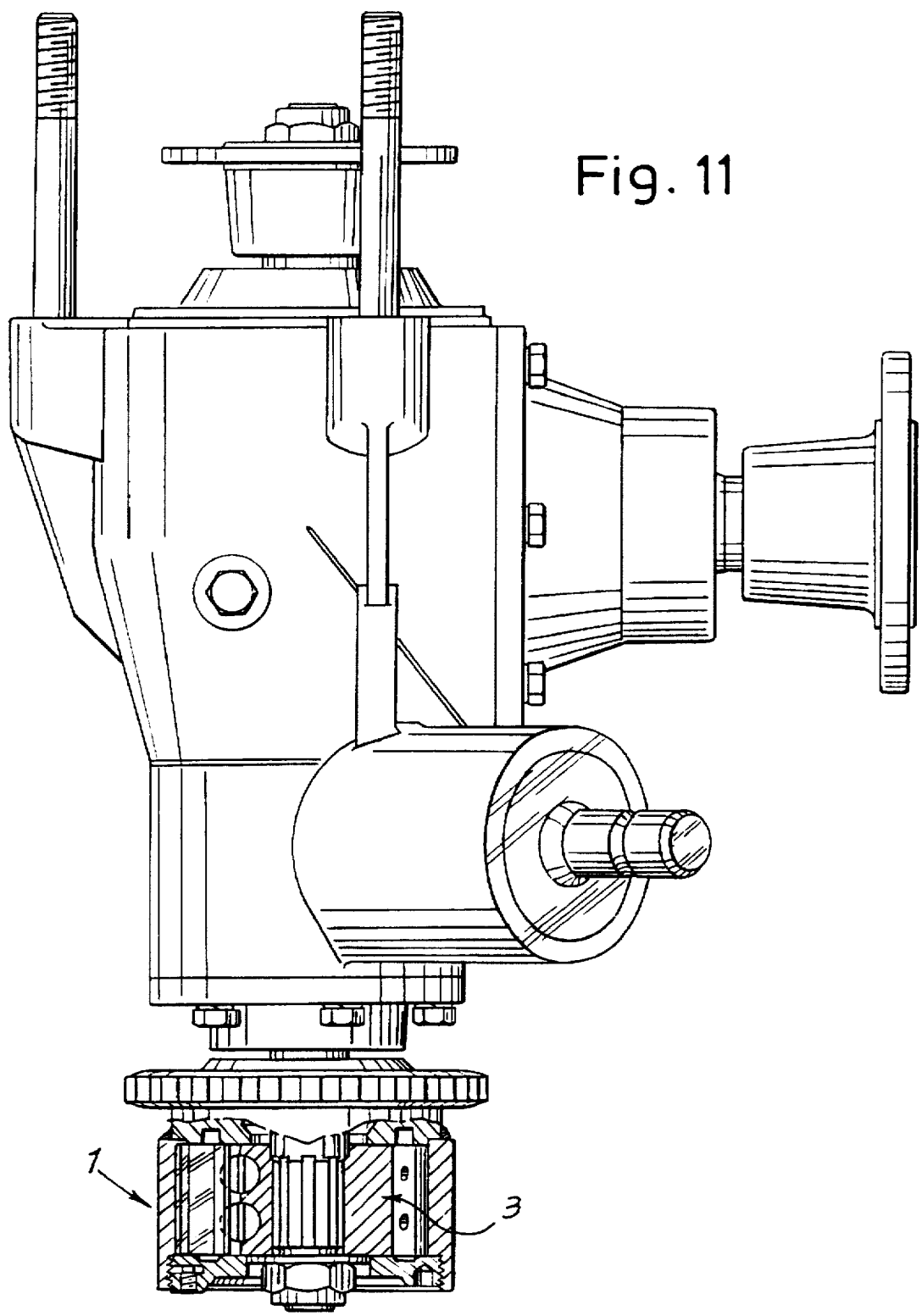
FIG. 11 shows a further application in a partially sectioned outer view.
Figure 13:
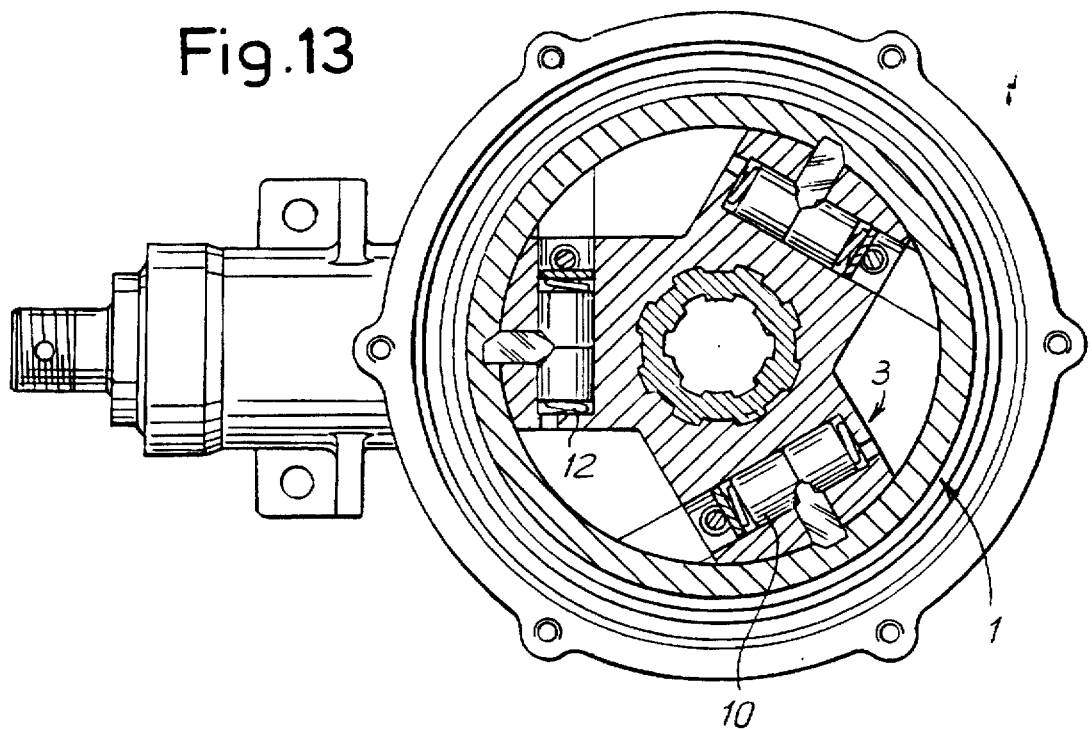
FIGS. 12 and 13 show yet another application to a conical-gear box, in a section along a plane passing through the axes of the two gears and in a section along XIII—XIII of FIG. 12.
Figure 12:
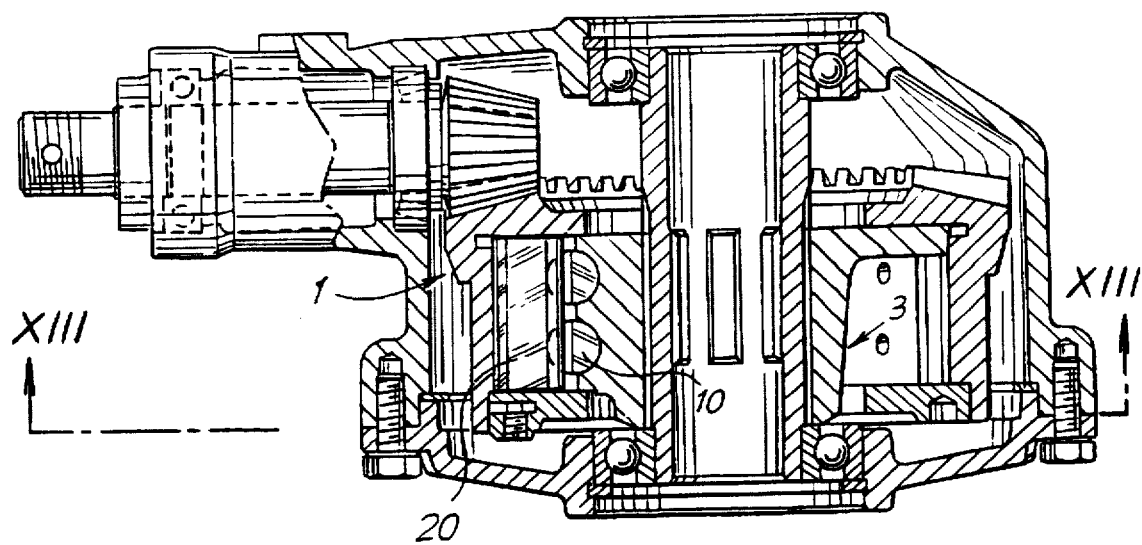
Figure 14:
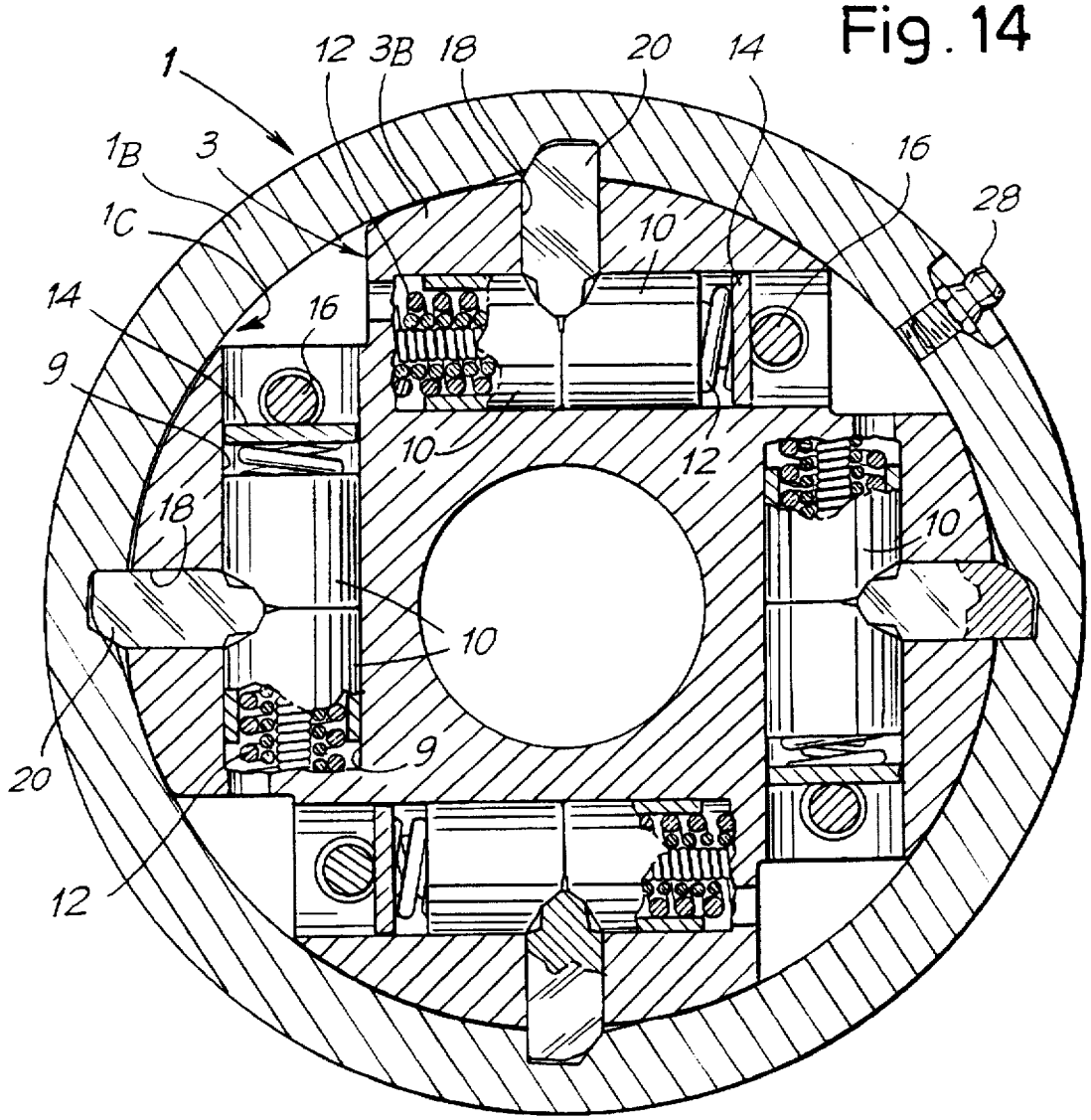
FIG. 14 shows another embodiment with four coupling units according to FIGS. 1 and 2.

In FIGS. 1 to 8 an application is envisaged in combination with a cardan articulation of a transmission shaft for example for telescopic transmissions which are customary in the art of agricultural machinery or the like. Applications may be varied; in FIGS. 9 et seq. a few of the possible versions are illustrated. In FIGS. 9 and 10 the combination of a joint with three or six units like those shown in FIGS. 1 and 2 is envisaged, for a toothed sprocket wheel or alternatively for a toothed gear wheel. In FIG. 11 the application of a contrivance like that of FIGS. 9 and 10 at the input or at the output of a transmission gearbox, illustrated generically, is shown. In FIGS. 12 and 13 the application of a joint or coupling according to the invention to a conical ring gear in a box for an angle transmission is shown. In FIG. 14 an embodiment is shown in which four units are arranged complanate, i.e. with the axes of the tangential seats of the four seats lying in the same plane orthogonal to the axis of rotation of the cone; this arrangement can be doubled by arranging another four units in another transverse plane.

It is to be understood that the drawing shows merely an illustration given solely by way of practical demonstration of the invention, it being possible for this invention to vary in form and in arrangement without however departing from the scope of the concept underlying the aforesaid invention.

The possible presence of reference numerals in the attached claims has the purpose of facilitating the reading of the claims with reference to the description and to the drawing, and does not limit the scope of the protection represented by the claims.

I claim:
1. A torque limiting joint comprising:
an outer member having an inner circumferential surface, said outer member defining a plurality of receptive recesses, each of said receptive recesses includes a first radial flank, a circumferential bottom portion, an inclined flank positioned at an incline to a radial direction, and a junction surface between said inner circumference surface and said inclined flank;
an inner member positioned inside said outer member, said inner member defining a plurality of tangential seats, each tangential seat extending orthogonally to said radial direction and lying parallel to a plane orthogonal to an axis of rotation of the joint, said inner member also defining a plurality of radial glide seats extending along said radial direction, each of said plurality of glide seats extending between a periphery of said inner member and one of said tangential seats;
a plurality of glide pads, two of said glide pads being slidably positioned in each of said plurality of tangential seats, said two glide pads in each said tangential seat having opposed surfaces with symmetrical shapings;
biasing means for biasing said opposed surfaces of each of said two glide pads together;
a plurality of sliders, one of said sliders being slidably positioned in each of said glide seats, each of said sliders having an inner end with a wedge shaped profile means for penetrating between said two glide pads of a respective tangential seat and part said two glide pads, each of said sliders having an outer profile means cooperating with one of said plurality of receptive recesses to transmit torque between said inner and outer member, said outer profile means includes a first radial flank, a circumferential end surface, an inclined flank positioned at an incline to said radial direction, and a junction surface positioned between said end surface and said inclined flank, said outer profile means and said receptive recess also generating an inner radial force on said slider in relationship to transmitted torque between said inner and outer member, said inner radial force moving said slider out of said receptive recess, said two glide pads and said biasing means moving a respective said slider into a respective said receptive recess below a predetermined speed difference between said inner and outer member.

2. A joint in accordance with claim 1, wherein:

said tangential seats are spaced from said axis of rotation.

3. A joint in accordance with claim 1, wherein:

said sliders have a plate-like shape with parallel walls.

4. A joint in accordance with claim 1, wherein:

said wedge shaped profile means includes first opposed surfaces defining a ridge of a wedge, said first opposed surfaces being angularly spaced by a first angle, said wedge shaped profile means includes second opposed surfaces adjacent said first opposed surfaces, said second opposed surfaces being angularly spaced by a second angle, said second angle being less than said first angle, said wedge shaped profile means includes third opposed surfaces adjacent said second opposed surfaces, said second opposed surfaces being angularly spaced by a third angle, said second angle being less than said third angle.

5. A joint in accordance with claim 1, wherein:

said opposing surfaces of said two glide pads each have a first opposing surface, said first opposing surfaces being angularly spaced from each other by a first angle, said opposing surfaces of said two glide pads each having a second opposing surface, said second opposing surfaces being angularly spaced from each other by a second angle, said second angle being less than said first angle.

6. A joint in accordance with claim 4, wherein:

said opposing surfaces of said two glide pads each have a first opposing surface, said first opposing surfaces of said two glide pads being angularly spaced from each other by said first angle, said opposing surfaces of said two glide pads each having a second opposing surface, said second opposing surfaces of said glide pads being angularly spaced from each other by said second angle, said second angle being less than said first angle.

7. A joint in accordance with claim 4, wherein:

said third angle is equal to said first angle.

8. A joint in accordance with claim 1, wherein:

said outer profile means includes a radial flank;

said radial flank of said receptive recesses and said outer profile means are parallel to said radial direction;

said circumferential bottom portion is adjacent one side of said inclined flank of said receptive recess, said junction surface of said receptive recess is adjacent another side of said inclined flank of said receptive recess.

9. A joint in accordance with claim 1, wherein:

said junction surface of said outer profile and said junction surface of said receptive passage are substantially parallel and contactable with each other when said inner and outer surfaces engage and disengage.

10. A joint in accordance with claim 1, wherein:

said sliders and receptive recesses are positioned symmetrically around said inner and outer members.

11. A joint in accordance with claim 1, wherein:

said tangential seats are formed as blind holes.

12. A joint in accordance with claim 1, wherein:

said spring means includes a plurality of springs biasing each said glide pad.

13. A joint in accordance with claim 1, wherein:

a shape of said receptive recesses, said outer profile means, said wedge shaped profile means, and said opposing surfaces cooperate with said biasing means to move said sliders into said respective said receptive recesses below said predetermined speed difference between said inner and outer member.

14. A joint in accordance with claim 1, wherein:

said receptive recesses, said outer profile means, said wedge shaped profile means, and said opposing surfaces each have first and second flat slopes for varying a magnitude of radial force applied to said slider.

\* \* \* \* \*